Dec. 6, 1932.  E. M. JOHNSON  1,890,329
POWER SYSTEM
Filed Jan. 28, 1931   2 Sheets-Sheet 1
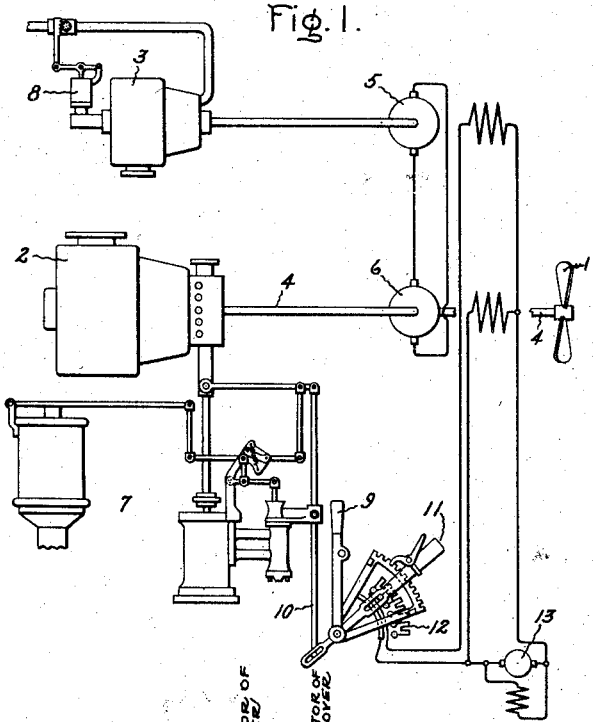
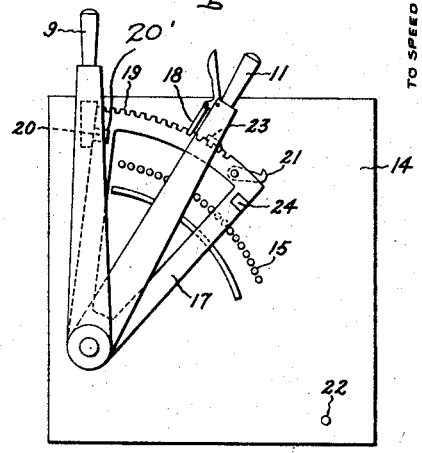
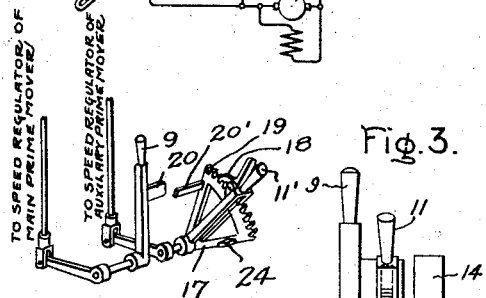
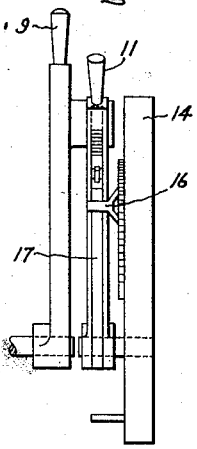
Inventor:
Eric M. Johnson,
by Charles E. Tullar
His Attorney.

Dec. 6, 1932.    E. M. JOHNSON    1,890,329
POWER SYSTEM
Filed Jan. 28, 1931    2 Sheets-Sheet 2
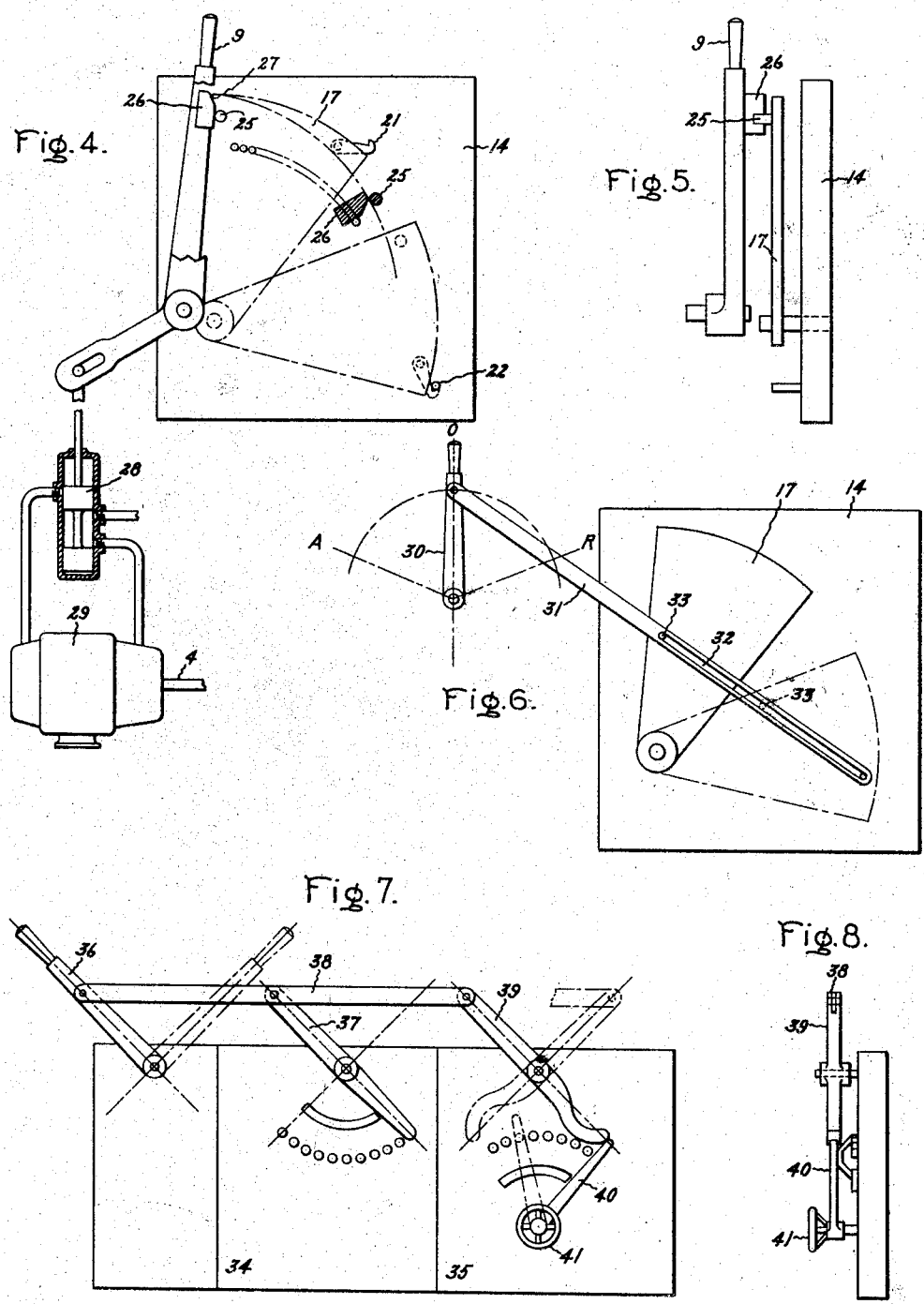
Inventor:
Eric M. Johnson,
by Charles O. Tullar
His Attorney Patented Dec. 6, 1932

1,890,329

UNITED STATES PATENT OFFICE

ERIC M. JOHNSON, OF WESTMINSTER, ENGLAND, ASSIGNOR TO GENERAL ELECTRIC COMPANY, A CORPORATION OF NEW YORK

POWER SYSTEM

Application filed January 28, 1931, Serial No. 511,897, and in Great Britain January 30, 1930.

This invention relates to power systems wherein power is supplied to a load device by a main prime mover and also by an auxiliary prime mover which is not mounted on the same shaft as the main prime mover.

In such systems there may be a risk of the auxiliary prime mover and any coupling between it and the main prime mover being excessively overloaded at certain times, for example when the power output of the main prime mover is reduced for any reason or when an exceptionally heavy supply of power is required by the common load device, and the present invention is more particularly concerned with the prevention of such overloading, it being realized that this is essential to enable power systems of this kind to be rendered suitable for use in applications such as for the propulsion of ships where various different operating conditions may be required to be met, necessitating considerable variation in the mean speed of the propeller as well as reversal of the direction of rotation of said propeller.

Accordingly the invention provides a power system of the character referred to wherein controlling means for varying the speed of the main prime mover is connected in a positive but adjustable manner with controlling means for varying the speed of the auxiliary engine or of the speed relation of the auxiliary engine and the main shaft, so as to ensure that under any given working conditions the ratio of the load on the auxiliary prime mover to the load on the main prime mover shall not exceed a determined value.

In one arrangement according to the invention, a coupling through which the power of the auxiliary prime mover is transmitted to the main shaft is provided of the kind which permits the velocity ratio of the transmission to be varied and means for varying the velocity ratio of said coupling is operatively connected with and dependent upon the operation of the means for varying the power output of the main engine, the connection being however adjustable.

In the case where the coupling consists for example of a direct current electric generator driven by the auxiliary engine and adapted to deliver power to an electric motor connected to the main shaft, the operating member of the regulating rheostat or rheostats of the electrical machines may be connected with the speed controller or regulator of the main prime mover in such manner that movement of the speed regulator of the prime mover to reduce the speed thereof effects an appropriate alteration of the rheostat and consequent speed variation of the motor, the correlation of the said speed regulator and rheostat being however adjustable.

According to an alternative arrangement, which does not require the employment of a coupling of adjustable velocity ratio between the auxiliary prime mover and the main shaft, but employs a coupling which although having a substantially fixed velocity ratio possesses some resilience so as to permit of cyclic variations in the speeds of one or both prime movers, such as are found to occur in all reciprocating prime movers, the speed regulator of the main prime mover is directly connected to the speed regulator of the auxiliary prime mover in an adjustable manner.

The means for connecting the speed regulator of the main prime mover with that of the auxiliary prime mover or with the change speed mechanism of the adjustable velocity ratio coupling may comprise a main controller or regulating member for the main prime mover and an auxiliary controller or regulating member for the auxiliary prime mover or the variable speed ratio coupling thereof. The two controlling or regulating members are so related that movement of the main regulating member to reduce the speed of the main prime mover also moves the auxiliary regulating member to reduce the speed of the auxiliary prime mover or the speed of the driven member of the coupling with respect to the driving member thereof, the movement of the auxiliary regulating member being effected through the intermediary of a connecting member adjustably arranged in such manner as to transmit movement of the main regulating member to the auxiliary regulating member irrespectively of their initial relative position. Means may also be provided to ensure that the auxiliary prime mover cannot transmit power to the main shaft unless the said connecting member is correctly disposed to maintain the desired interconnection of the two regulating members.

With such an arrangement, if the power of the main prime mover is reduced by operation of the main regulating member, the power of the auxiliary prime mover or the load imposed thereon by the coupling will be simultaneously reduced, unless it has been previously reduced by a corresponding amount to the reduction now made in the power of the main prime mover, so that no extra load is thrown on the auxiliary prime mover. However when the main shaft runs below its normal speed due to extra heavy loading thereof and the main prime mover is working with its regulating valve fully open, overloading of the auxiliary prime mover during the continuance of that condition must be prevented by adjusting the auxiliary regulating member independently of the main regulating member. If, now, the speed of the main shaft is still further reduced by manipulation of the main regulating member, then in accordance with the invention the auxiliary regulating member will be moved by reason of its connection with the main regulating member so as to prevent overloading of the auxiliary engine, and notwithstanding that independent regulation of the auxiliary engine had previously been made.

While various forms of prime movers may be employed in the power plant concerned, the main prime mover may conveniently consist of a steam engine or steam turbine while the auxiliary prime mover may take the form of a steam engine, steam turbine or a Diesel engine. As a further example, the main and auxiliary prime movers may be respectively a slow speed Diesel engine directly coupled to the main shaft and a high speed Diesel engine coupled to the main shaft either through a flexible coupling or a variable speed gear or through a flexible coupling and a variable speed gear.

Various forms of controlling means may be employed to carry out the invention and some constructions according thereto will now be described by way of example.

In the accompanying drawings Fig. 1 is a diagrammatic view of a ship propulsion system embodying my invention; Figs. 2 and 3 are front and side views of the controlling means shown in Fig. 1; Figs. 4 and 5 are front and side views of a modified form of controlling means which may be used in place of the controlling means shown in Figs. 2 and 3, and Figs. 6, 7, 8 and 9 show further modifications of controlling means operating in accordance with my invention which may be used in place of the controlling means shown in Fig. 1.

In the system shown in Fig. 1, power is supplied to the propeller 1 by a main prime mover 2 and by an auxiliary prime mover 3. Various forms of prime movers may be used but in drawings the prime movers have been illustrated as steam turbines. The main prime mover 2 furnishes its power directly to the propeller 1 through a shaft 4 and the auxiliary prime mover 3 furnishes its power to the propeller 1 through an electrical coupling comprising a generator 5 and a motor 6. The generator 5 is driven by the auxiliary prime mover 3 and the motor 6 is connected to the propeller 1.

The power output of the main prime mover is controlled by a governor 7, which has been illustrated as having the construction of the governor in Emmet Patent No. 1,137,308 of April 27, 1915, although other forms of controlling means may be used. The speed of the auxiliary prime mover 3 is controlled by a governor 8 and the output of this prime mover to the propeller 1 is controlled by suitably controlling the electrical coupling 5, 6. The governor 7 for prime mover 2 is under the control of a lever 9 which is connected to the governor actuating rod 10 and the electrical coupling 5, 6 is under the control of a lever 11 which may control the excitation of the generator, the motor or the generator and motor. In the system illustrated it controls the excitation of the generator 5 through a rheostat 12. Exciting current for the generator and motor is supplied by an exciter 13.

The rheostat controlling lever 11 is rotatably mounted upon a face-plate 14 having a number of fixed contact studs 15 with which a contact brush 16 carried upon said arm is adapted to cooperate. Movement of the arm 11 in the one or other direction over the studs is adapted to cause successively increasing or decreasing amounts of resistance to be inserted in the excitation circuit of the electric generator 5 so that the operating speed of the electric motor 6 which is mechanically connected to the main shaft 4 may be varied between minimum and maximum values in a well known manner. When the arm 11 is moved in the clockwise direction the speed of the motor 6 is reduced until the arm passes beyond the range of the studs 15 in that direction whereby the power supply to the motor will be entirely cut off.

The contact arm 11, which may conveniently be formed of two parts, as seen in Fig. 3, carries a sector-shaped plate 17, the position of which is adjustable relatively thereto so that more or less of the said plate may extend on one side of the arm. The plate 17 is held in an adjusted position on the arm by means of a spring detent 18 mounted on the arm 11 and adapted to engage any one of a series of notches 19 in the plate.

The lever 9, hereinafter referred to as the

"regulator" arm, is rotatably mounted coaxially with and independently of the rheostat arm 11. The regulator arm has a projection 20 extending into the path of the sector plate 17, so that if the regulator arm is moved towards the rheostat arm, the projection 20 ultimately comes into contact with the end or a stop 20' at one end of the sector plate 17 and thus limits the angular position of the one arm with respect to the other. The angle between the two arms is limited by the length of the arcuate portion of the sector plate 17 extending on one side of the rheostat arm 11. Further movement of the regulator arm in the direction to reduce the power output of the main prime mover will be transmitted to the rheostat arm when the projection on the regulator arm comes into contact with the plate 17 carried by the rheostat arm.

The sector plate 17 carries a latch member 21 preferably spring-pressed, and adapted to engage a pin 22 on the face-plate 14 when the sector plate is moved clockwise by the rheostat arm into an extreme position beyond that in which the resistance in the generator excitation circuit has been raised to a maximum and the motor is no longer supplied with power. When the sector plate is in this position and the latch 21 engages the pin 22, it lies wholly beyond the range of the contact studs 15 so that to whatever position the rheostat arm may be moved upon the sector plate, the motor will remain inoperative. Moreover, in this position of the sector plate, the regulator arm, if moved so as to reduce and eventually to cut off the motive fluid of the prime mover, will bring its projection into engagement with the end of said plate.

The rheostat arm 11 further carries an abutment 23, which may be brought into contact with the latch 21 for the purpose of releasing same from the pin 22 by movement of the rheostat arm to the extreme end of the sector plate remote from the regulator arm.

It is thereby assured that if the power supply to the motor is once cut off it will be necessary for the rheostat arm to be moved to the extreme end of its travel and have the maximum length of sector plate between it and the regulator arm before the sector plate can be released from the stop so as to permit the rheostat arm being moved over the contact studs and the motor to be reenergized.

The latter operation cannot however occur until the regulator arm 9 is moved into a position to admit motive fluid to the main prime mover. The rheostat arm may then be moved until its sector engages the projection of the regulator arm, and if the detent 18 be released the arm may be moved relatively to the contact studs 15 and the length of the sector extending between the contact arm and the regulator arm may be adjusted until the electrical machinery is loaded to the required degree according to the prevailing operating conditions. While these same conditions obtain, movement of the regulator arm to reduce speed will be accompanied by corresponding movement of the rheostat arm, while movement of the regulator arm to increase speed may be followed if desired by a limited movement of the rheostat arm as determined by the effective length of the sector plate.

The stops 20', 24, carried by the sector plate 17, limit the total amount of movement which may be given to the rheostat arm relative to said plate. The arrangement of the sector plate is preferably such that the friction between it and the rheostat arm is sufficient to hold it in position with respect to said arm when the detent is disengaged from the associated notches. The friction may be increased by spring pressure if desired.

In some cases it may be preferred to associate the rheostat arm with the speed regulator of the prime mover, not directly as above described, but by the aid of suitable intermediate links or gearing. Such an arrangement would be desirable for example in cases where the speed regulator consists of a valve which requires a number of turns of a hand wheel or the like to open or to close it.

In a plant of the kind referred to it may be required to reverse the main prime mover without at the same time reversing the auxiliary prime mover. This may be provided for by causing the reversing control mechanism of the main prime mover to actuate means for disconnecting the coupling between the auxiliary prime mover and the load in passing from the forward or "ahead" to the reverse or "astern" position. Such means may be operated by a continuation of the motion giving speed regulation of the auxiliary prime mover or of the coupling, or they may comprise separate disconnecting apparatus operated in a known manner from the reversing gear of the main prime mover. The connection between the reversing control mechanism and the coupling may be such that the coupling is not reestablished automatically when the said mechanism is returned to the forward position.

The apparatus constructed as above described may be readily adapted for this purpose. Thus, for example, in the case where reversing control of the main prime mover is a continuation of speed control on the opposite side of the zero point the arrangement shown in Figs. 4 and 5 may be employed. These figures show parts of the apparatus illustrated in Figs. 2 and 3 modified for the purpose in view. The regulator arm 9 which is shown partly broken away in Fig. 4 is mounted excentrically with the contact arm 11 (not shown) and sector plate 17 instead of coaxially therewith. The sector plate 17 is provided with a pin 25 adapted to engage the projecting lug 26 on the regulator arm 9. The profile of the lug 26 is formed as shown at 27 so as to facilitate its disengagement from the pin 25 as the rheostat arm approaches its off position. The hatched portions of Fig. 4 show the lug and pin in the position in which they are about to disengage. The broken lines indicate the extreme position taken up by the sector plate 17 when the latch 21 engages the pin 22. In this position the contact maker passes out of engagement with studs 15 and no power is then supplied to the motor.

The regulator arm 9 is connected to the throttle valve 28 which controls the supply of steam to the forward and reversing wheels of the main prime mover 29 shown in this figure. When the lever arm 9 occupies a position where lug 26 attains the position shown by the hatched lines steam is cut off from both the forward and reversing wheels of the prime mover. Further movement of arm 9 in a clockwise direction supplies steam to the reversing wheels of the prime mover for reverse operation.

It will be clear from a comparison of Figs. 4 and 5 with Figs. 2 and 3 that whatever may be the temporary relative positions of the rheostat arm 11 and sector 17, the rheostat arm will always have reached its off position at least when the regulator arm 9 has attained an angular position indicated approximately by the hatched position of the lug 26 in Fig. 4. The entire mechanism is so disposed with reference to the various positions (forward and reverse) of the regulator arm that reversal of the main prime mover will not take place until the regulator arm has been moved in the clockwise direction beyond the hatched position of the lug 26 above referred to.

It is preferable that there should be a definite overlap at this stage and that in consequence the motor will be deenergized, that is, the coupling between the auxiliary prime mover and the main shaft will be disconnected before the main prime mover is fully unloaded.

In cases where the reversing control of the main prime mover is not a continuation of speed control, but obtained from another mechanism, provision of the kind referred to will not be necessary. If, however, no interlock is provided between the speed control and reversing control of the main prime mover to ensure that the speed control is returned to the off position before reversal can take place (and at the same time consequently to ensure that the coupling is disconnected by its control being simultaneously returned to the off position as previously described) then provision may be made to connect the regulator of the coupling or of the auxiliary prime mover to the reversing mechanism itself.

One method by way of illustration is shown in Fig. 6. In this figure 14 is the rheostat base plate and 17 the sector plate shown in Figs. 2, 3, 4, and 5. The reversing lever of the main prime mover is shown, for example, as a lever 30. This lever is connected to the sector plate 17 by means of a connecting rod 31 engaging by a slot 32 with a pin 33 on the sector plate 17.

The length and positions of the slot are so selected that whatever the position of the sector plate it is always returned to the same position shown in broken lines when the regulating reversing lever 30 is moved from the position marked O, which is the zero or "off" position, to the position marked R, which is the reverse or "astern" position. The final position of sector 17 is such that even when the rheostat arm has been rotated as far as possible in a counter-clockwise direction upon the sector plate, the rheostat arm (not shown in Fig. 6) will finally be in its zero or "off" position before the reversing lever 30 reaches the position for reverse or "astern" running.

An alternative construction for effecting the desired control of the motor-generator coupling in accordance with the operation of the speed regulator of the main prime mover may utilize two rheostats, one associated with the regulator arm of the main prime mover so as to be movable in accordance therewith substantially as above described, and the other being independently adjustable. Such construction preferably includes interlocking means to ensure that the operating arm of the independently adjustable rheostat cannot be moved from the "off" position unless the arm of the other rheostat is in a position where further movement is limited by the regulator arm, and further the last mentioned rheostat arm cannot be moved from the "off" position unless the first mentioned rheostat arm is also in the "off" position.

In the construction which will now be described the auxiliary prime mover is provided with two controls in series (for example two rheostats for an electrical coupling or two throttle valves for a prime mover) and full power cannot be obtained unless both these controls are in the "full" on position and power is cut off if either of the controls is returned to the "off" position.

Such an arrangement is illustrated by way of example in Figs. 7 and 8 of the drawings in which 34 and 35 are two rheostats, and 36 the regulator arm of the main prime mover. The arm 37 of rheostat 34 is coupled to the regulator arm 36 by means of the link 38, which is also connected to an arm 39 associated with the arm 40 of rheostat 35 but not connected to it. Rheostat 34 is thus driven in unison with or in fixed ratio to the regulator arm 36. The arm 40 of rheostat 35 on the other hand is capable of being independently operated by means of the hand wheel 41. The arm 39 moving in unison with or in fixed ratio to arm 36 engages with arm 40 in such a manner that for every position of regulator arm 36 there is a definite limit to the movement of arm 40 in the counter-clockwise direction to increase the load on the auxiliary prime mover, as will be evident from the two extreme positions of arm 39 shown in Fig. 7.

It will also be seen that no matter what the position of arm 40 may be, movement of regulator 36 to reduce the speed of the main prime mover, as in the arrangements already described, produces an appropriate reduction in the load on the auxiliary prime mover through the medium of rheostat 34, and if continued far enough will eventually also move rheostat 35 towards its "off" position so that the next time the plant is loaded up power cannot be put on the auxiliary prime mover except under the control of rheostat 35.

It will be understood that instead of regulating the motor-generator coupling by means of one or more rheostats in the generator excitation circuit as described in the above example, resistance in the motor field circuit for example, or in both generator and motor field circuits may be employed for this purpose if desired, the controlling apparatus being modified accordingly.

A similar control arrangement can be used for the direct control of the auxiliary prime mover through the medium of the two valves which may be connected together and to the regulator of the main prime mover in a similar manner to that shown in Figs. 7 and 8, or through other forms of connection, for example, gearing, in an equivalent manner. Other methods of connecting the two rheostats and the regulator arm may also be employed provided the relations described in connection with Fig. 6 are maintained.

As pointed out above an alternative arrangement may be provided in which the speed regulator of the main prime mover is directly connected to the speed regulator of the auxiliary prime mover in an adjustable manner. One way of obtaining this connection is shown in Fig. 9 of the drawings. The arrangement of parts illustrated in Fig. 9 is essentially the same as that shown in Figs. 2 and 3, except that the rheostat arm 11 becomes a regulating arm 11' for controlling the speed of the auxiliary prime mover. The regulator arms 9 and 11' are respectively connected to the throttles or governors of the main and auxiliary prime movers through suitable mechanical connections indicated in the drawings. The correspondence of parts in the arrangement shown in Fig. 9 to that shown in Figs. 2 and 3 is apparent and like reference numerals have been applied to like parts. As in the arrangement illustrated in Figs. 2 and 3, the arrangement in Fig. 9 operates to set the maximum power output of the auxiliary source relative to the main source through the agency of the sector plate 17 and the stops 20 and 21'. The operator by setting arm 9 to a predetermined position may determine the speed of the main prime mover. Thereafter, by operating arm 11' the speed of the auxiliary prime mover may be adjusted but due to stops 20 and 20' the speed of the auxiliary prime mover cannot be increased above a predetermined value determined by the setting of the plate 17 relative to arm 11'. This setting also prevents the operator decreasing the speed and power output of the main prime mover relative to the speed and power output of the auxiliary prime mover below a predetermined ratio since after this ratio has been attained movement of arm 9 also causes simultaneous movement of arm 11'.

In cases where it is desired to control the operation of the prime mover from a number of different places, for example, by controlling a throttle valve and also the boiler fans, apparatus of the character above described may be provided at each point of control. In such case the resistances of the two rheostats or sets of rheostats may be connected in series and arranged so that the full power cannot be obtained unless both rheostats or sets of rheostats are in the "full on" position, while movement of any one of the rheostats towards the "off" position will produce the desired change in the electrical system.

It will be apparent from the foregoing description that the invention provides means whereby the loading of the main and auxiliary prime movers may be apportioned in a desired manner and the load on the main prime mover may be varied while maintaining that on the auxiliary prime mover constant or while varying it also in a predetermined manner, the risk of excessively overloading the auxiliary prime mover being substantially eliminated.

While in the above description a single auxiliary prime mover has been referred to, it will be apparent that a plurality of auxiliary prime movers may be provided if desired, arranged and protected against the risk of overloading substantially as hereinbefore indicated.

The invention may employ various forms of resilient or flexible couplings as well as couplings of adjustable velocity ratio between the auxiliary prime mover and the load besides the electrical form of coupling hereinbefore mentioned, and various other modifications may be made without departing from the invention.

What I claim as new and desire to secure by Letters Patent of the United States, is:

1. A power system comprising a main source of power, an auxiliary source of power, a load device common to both of said power sources, means for controlling the output of said main source of power, means for controlling the output of said auxiliary source of power, and means associated with both of said controlling means for setting the maximum power output of said auxiliary source relative to said main source.

2. A power system comprising a main source of power, an auxiliary source of power, a load device common to both of said power sources, means including a lever for controlling the output to said main source of power, means including a lever for controlling the output of said auxiliary source of power, and an adjustable stop device associated with one of said levers and extending in the path of movement of the second of said levers for limiting the maximum power output of said auxiliary source of power relative to said main source of power.

3. A power system comprising a main source of power, an auxiliary source of power, a load device common to both of said power sources, means for controlling the output of said main source of power, means for controlling the output of said auxiliary source of power, and means for setting the maximum power output position of said auxiliary controlling means for any given power position of said main controlling means and for simultaneously operating said auxiliary controlling means toward its off-position when said main controlling means is moved toward its off-position below said given power position.

4. A power system comprising a main source of power, an auxiliary source of power, a load device common to both of said power sources, means for controlling the output of said main source of power, means for controlling the output of said auxiliary source of power, means for setting the maximum power output position of said auxiliary controlling means for any given power position of said main controlling means and for simultaneously operating said auxiliary controlling means toward its off-position when said main controlling means is moved to a position below said given power position, means for locking said last-mentioned means in the position it assumes when the main control means is in its off-position, and means associated with said auxiliary power controlling means for unlocking said means when said auxiliary control lever is moved to its extreme off-position.

5. A power system comprising a main source of power, an auxiliary source of power, a load device common to both of said power sources, means for controlling the direction of rotation and amount of power supplied by said main source of power to said load device, and means responsive to said last-mentioned means for interrupting the supply of power from said auxiliary source of power to said load device before said main controlling means is moved to a position for reverse operation of said main source of power.

6. A power system comprising a main source of power, an auxiliary source of power, a load device common to both of said power sources, means for controlling the direction of rotation and amount of power supplied by said main source to said load device, means for controlling the amount of power supplied from said auxiliary source to said load device, means associated with said controlling means for setting the maximum power output of said auxiliary source relative to said main source for any given forward operating position of said main controlling means and for simultaneously decreasing the output of said auxiliary source with said main source when the controlling means for said main source is operated beyond said given position toward its off-position, said means being inoperative after said auxiliary controlling device has been moved to its off-position.

7. A power system comprising a main source of power, an auxiliary source of power, a load device common to both of said power sources, means for controlling the output of said main source of power, means, including a plurality of devices arranged in series with one another so that movement of either of said devices to its off-position reduces the output of said auxiliary prime mover to zero, for controlling said auxiliary prime mover, means for connecting said main controlling means to one of said devices for simultaneous operation therewith, and means connected to and operated by said main controlling means for limiting the maximum power position of the other of said devices and for returning it to its off-position when said main controlling means is moved to its off-position.

8. A ship propulsion system comprising a propeller, a main prime mover for driving said propeller, an electric motor for driving said propeller, an auxiliary prime mover, a generator driven by said auxiliary prime mover, means for electrically coupling said generator and said motor, means for controlling the power output of said main prime mover, means for controlling the power coupling between said generator and said motor, and means associated with said controlling means for limiting the maximum amount of power supplied through said electrical coupling to said propeller for any given position of said main controlling means and for decreasing the power supplied through said coupling and when said main controlling means is moved toward its off-position beyond said given position.

9. In a ship propulsion system, a propeller, a main prime mover for driving said propeller, an electric motor for driving said propeller, an auxiliary prime mover, a generator driven by said auxiliary prime mover, means for electrically connecting said generator and said motor, means for controlling the output of said main prime mover to said propeller, means for controlling the power output of said auxiliary prime mover through said generator and motor to said propeller, a stop device attached to one of said controlling means and extending into the path of movement of the other of said controlling means for limiting the movement of one of said controlling means toward the other of said controlling means and for setting the power position of the controlling means associated with said auxiliary prime mover for any given power position of the controlling means associated with said main prime mover.

10. In a ship propulsion system, a propeller, a main prime mover for driving said propeller, an electric motor for driving said propeller, an auxiliary prime mover, a generator driven by said auxiliary prime mover, means for electrically connecting said generator and said motor, means for controlling the output of said main prime mover to said propeller, means for controlling the power output of said auxiliary prime mover through said generator and motor to said propeller, a stop device associated with and adjustable relatively to the controlling means for said auxiliary prime mover extending into the path of movement of the controlling means for said main prime mover for operating said auxiliary controlling means by said main controlling means when it is moved to its off-position, means for locking said stop device in the position it assumes when said main controlling means is in its off-position, and means associated with said auxiliary controlling device for unlocking said stop device when said auxiliary control means is moved to its extreme off-position.

In witness whereof I have hereunto set my hand this 14th day of January, 1931.

ERIC M. JOHNSON.